United States Patent
Zoch et al.

(10) Patent No.: US 11,157,314 B2
(45) Date of Patent: Oct. 26, 2021

(54) CONVERGENCE SCHEDULING

(71) Applicant: salesforce.com, inc., San Francisco, CA (US)

(72) Inventors: Jeffrey Zoch, San Francisco, CA (US); Ted Liu, Los Altos, CA (US); Karthik Mohan Subramanian, Sunnyvale, CA (US); Youngjin Yu, Cupertino, CA (US); Bo Xia, Vienna, VA (US); Yeshwant Sai Madanagopal, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 142 days.

(21) Appl. No.: 16/709,659

(22) Filed: Dec. 10, 2019

(65) Prior Publication Data
US 2021/0173703 A1    Jun. 10, 2021

(51) Int. Cl.
*G06F 9/46* (2006.01)
*G06F 9/48* (2006.01)

(52) U.S. Cl.
CPC ...... *G06F 9/4881* (2013.01); *G06F 2209/482* (2013.01); *G06F 2209/486* (2013.01)

(58) Field of Classification Search
CPC ............. G06F 9/4881; G06F 2209/482; G06F 2209/486
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |

(Continued)

*Primary Examiner* — Diem K Cao
(74) *Attorney, Agent, or Firm* — Jaffery Watson Mendonsa & Hamilton LLP

(57) ABSTRACT

Examples include a computer-implemented method for determining one or more observations about a computing system, determining a plurality of sets of one or more actions based at least in part on a plurality of policies and the one or more observations; reducing the plurality of sets of one or more actions to generate a reduced set of actions, the reduced set of actions including scheduling a computing system to execute the reduced set of actions by requesting one or more idempotent tickets to be created in a ticketing system; and performing, or causing to be performed, the reduced set of actions.

23 Claims, 12 Drawing Sheets

(56) References Cited

U.S. PATENT DOCUMENTS

| | | |
|---|---|---|
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0177744 A1 | 7/2009 | Marlow et al. |
| 2014/0189017 A1* | 7/2014 | Prakash ............... G06Q 10/109 709/206 |

\* cited by examiner

CONVERGENCE SCHEDULING

BACKGROUND

The field of invention relates generally to managing work performed by computing services, and, more specifically, to scheduling actions in a ticketing system for managing performance of services in a cloud computing environment.

Cloud computing services provide shared resources, software, and information to computers and other devices upon request or on demand. Cloud computing typically involves the over-the-Internet provision of dynamically scalable and often virtualized resources. Technological details can be abstracted from end-users (e.g., client computing systems), who no longer have need for expertise in, or control over, the technology infrastructure "in the cloud" that supports them. In cloud computing environments, software applications can be accessible over the Internet rather than installed locally on personal or in-house computer systems. Some of the applications or on-demand services provided to clients can include the ability for a user to create, view, modify, store and share documents and other files.

In some cloud computing environments, a cloud services provider (CSP) manages large numbers of computing resources such as databases (e.g., thousands or even tens of thousands of databases worldwide) and/or Software as a Service (SaaS) applications. Databases may need to be backed up and/or restored periodically and/or on-demand to provide a required level of service to customers of the CSP. Efficiently managing performance of large numbers of administrative and operational tasks (e.g., backups, restores, resets, shutdowns, other actions, and so on) relating to these computing resources in a large-scale computing environment can be a difficult challenge.

DETAILED DESCRIPTION

Figure 1:
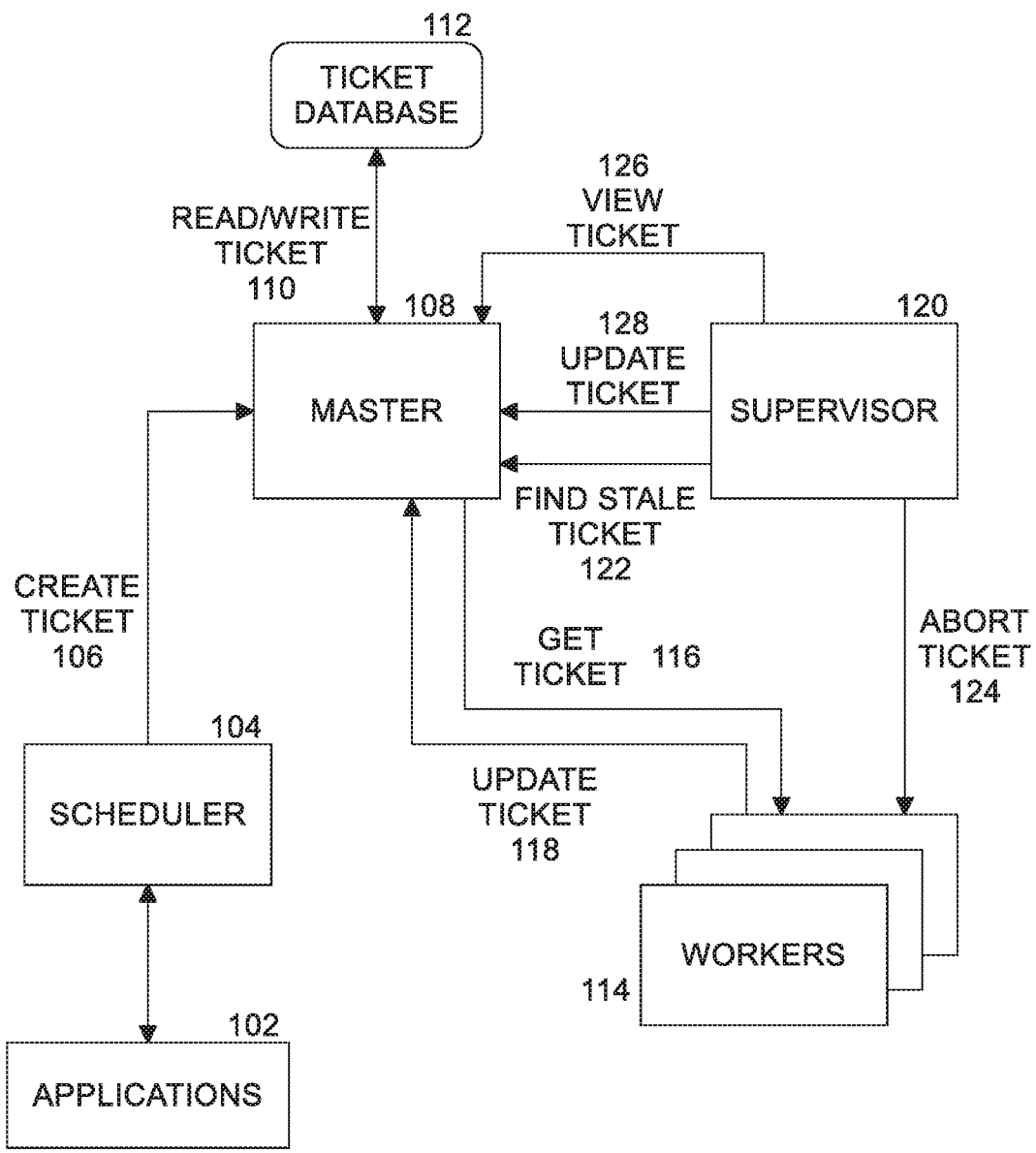
FIG. 1 illustrates a ticketing system according to some embodiments.

FIG. 1 illustrates a ticketing system 100 according to some embodiments. Embodiments of the present invention provide for ticketing system 100 for managing the lifecycle of repeated software operations. In some computing environments, there are thousands of computing resources such as databases and/or applications, and there is a need to run jobs of various natures on subsets of the computing resources. For example, a job may be the backup or restore of a database, but a job as used herein may generally comprise any computing work to be performed in a computing system. In order to do so reliably and efficiently, embodiments of the present invention comprise a system architecture of a ticket system 100 including the following components: a master ticket application programming interface (API) 108, a "pluggable" scheduler 104, a supervisor 120, and a plurality of stateless workers 114 In one embodiment, the interface to the scheduler is defined and a default implementation for the scheduler is described. In other embodiments, other implementations of schedulers may be used with the same interface.

Scheduler 104 communicates with one or more applications 102 in a computing environment to determine when a job needs to be performed. The concept of a "ticket" is used to record all the relevant information needed to maintain the lifecycle of a job. A ticket is created as part of the job's initial scheduling, passed to a worker 114 so the worker knows what processing task needs to be performed, and returned to the master 108 so that the master can update the ticket as completed. Each ticket represents an idempotent piece of work such that the ticket can be retried, if necessary, without fear of causing harm to system 100 or the larger computing environment. Tickets can be requested in batches and can be run serially or in parallel depending on how the tickets are scheduled. Once scheduler 104 determines that a job needs to be performed, scheduler calls a create ticket function 106 in master 108. In one embodiment, the scheduler determines whether a job needs to be performed based at least in part on a set of conditions obtained from one or more applications being executed by a computing system. Master 108 creates the ticket and stores the ticket in ticket database 112 using read/write ticket function 110.

In an embodiment, master 108 controls all access to tickets. The scheduler 104 operates as a client of master 108 to request creation of a ticket. In some embodiments, a worker 114 can also be a scheduler 104, as these are just logical mappings in ticketing system 100.

In some embodiments, scheduling is done via a convergence-based scheduler 104 (e.g., one that defines transformations from a current state to a goal state), although the present design allows for a pluggable/swappable scheduler based on the needs of system 100. A scheduler 104 operates as an independent service and can employ redundancy by scaling horizontally (e.g., using multiple schedulers), if necessary. This decoupling allows ticketing system 100 to continue making progress on requested work if the scheduler goes down, and to continue creating work tickets if any of the workers 114 are down. If master 108 is down, no ticket updates can be made, so in embodiments the master is deployed as a stateless application (or process) that scales horizontally. The state of master 108 can be stored in ticket database 112.

In an embodiment, one or more workers 114 poll the master 108 for tickets that workers can perform. In an embodiment, a worker 114 calls a get ticket function 116 of master 108. In response, master 108 determines if there is a ticket in ticket database 112 that the worker can process. If so, master 108 sends the ticket to the requesting worker. There may be any number of workers 114 in system 100. This allows for the workers to take just the right amount of work that the workers can perform efficiently and to simplify the design of master 108, as master 108 does not need to know about the current capabilities of any worker before the worker requests work. In order to prevent workers from stealing work from other workers, in one embodiment an entity identifier (ID) is included in the ticket to restrict the ticket's performance to a particular one or more workers (or class of workers). This can be useful if a selected work action must be performed by a particular one or more workers (or class of workers).

With the one or more schedulers 104 scheduling work (via tickets) independently and at their own pace and workers 114 polling master 108 independently and at their own pace, ticketing system 100 is eventually consistent. There are no hard guarantees on when or if work will be completed as the ticketing system must be resilient to network partitions and other fault domains, but the ticketing system can assure that work will be dispatched to a worker 114 as soon as a worker asks for the work. Once received, worker 114 performs the work specified by the ticket and may choose to be polled for the worker's status by the supervisor 120 or the worker can push updates to the master. In one embodiment, the polling model is more reliable as worker 114 does not need to "remember" to push status of the work at the end (especially in the face of a system crash or other failure) but push models are more latency sensitive. In some embodiments, care must be taken in the case of a push approach by the worker to record what tickets are being worked on so that if the ticketing system crashes the worker can resume work on a ticket once the ticketing system restarts. Once the job (as described by a ticket) is completed, the ticket can be updated to either completed or failed. If the ticket has been successfully completed, processing is done for the ticket, but if performance of the ticket has failed supervisor 120 can reset the ticket to a "new" state so the ticket can be retried.

When worker 114 has completed processing of the ticket received from master 108, worker 114 calls an update ticket function 118 to update the ticket with the current status. Master 108 updates the ticket information and/or status in ticket database 112.

In an embodiment, supervisor 120 calls a find stale ticket function 122 to determine if any one or more tickets are not being processed by a worker in a timely manner. In an embodiment, staleness may be determined by a time threshold for the type of work to be performed according to the ticket. If there are one or more stale tickets, supervisor 120 resets the stale ticket at least in part by calling a view ticket function 126 and an update ticket function 128.

In an embodiment, one or more of applications 102, scheduler 104, master 108, supervisor 120, and workers 114 may be executed independently and concurrently by different processing cores of a multi-core computing system, different processing threads of a multi-threaded computing system, or different tasks in a computing system. In various embodiments, there may be one or more schedulers 104, one or more masters 108, one or more supervisors 120, and one or more workers 114, in any combination, that may be scaled to meet the processing needs of ticketing system 100 and a particular computing environment. In an embodiment, there is one scheduler 104, one master 108, one supervisor 120, and many workers 114 (e.g., tens, hundreds, thousands, even tens of thousands of workers) in ticketing system 100.

In an embodiment, there is one scheduler 104 for each type of job (e.g., operation or op type) possible to be performed for a ticket. For example, in one embodiment there are six op types as shown below.

| | |
|---|---|
| RMAN_L1 | (incremental backup) |
| RMAN_ARCH | (archive log backup) |
| FS_SNAPSHOT | (file system backup) |
| SDD_PURGE_SNAPSHOT | (destroy backup) |
| SDD_RESTORE_SNAPSHOT | (restore backup) |
| SDD_SNAPSHOT | (make backup) |

Thus, in one embodiment there are a plurality of schedulers, each scheduler adapted for a selected one of a plurality of types of jobs to be performed for the ticket; and a plurality of workers, each worker adapted for a selected one of a plurality of types of jobs to be performed for the ticket. A worker of a selected one of the plurality of types of jobs is restricted to only perform jobs of that type. In an embodiment, the is enforced by the master using the entity ID field in the ticket.

Figure 2:
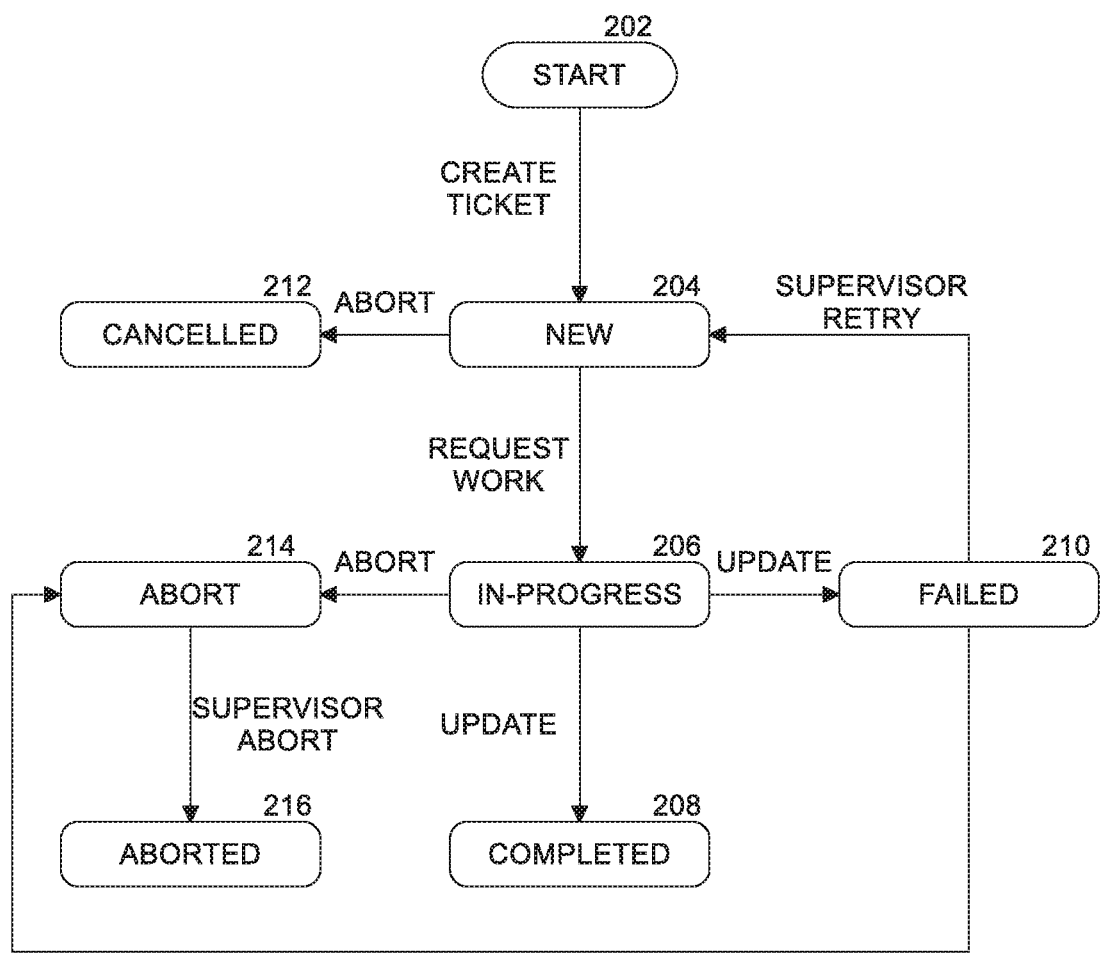
FIG. 2 is a state transition diagram for a ticket in a ticketing system according to some embodiments.

FIG. 2 is a state transition diagram 200 of a ticket in ticketing system 100 according to some embodiments. In an embodiment, a state of a ticket is stored in ticket database 112. After start 202, when a ticket is created using create ticker function call 106, a state of "new" 204 is reached. When work is requested for the ticket by a worker 114 (e.g., using the get ticket function 116), the state of the ticket is set to "in-progress" 206. Once the worker has processed the ticket (e.g., by successfully performing the job defined by the ticket), the state of the ticket is set to "completed" 208. If the ticket is cancelled after creation but before the ticket is received by worker 114, the state of the ticket is set to "cancelled" 212. This might occur, for example, when a system administrator proactively cancels the job. If the worker cannot successfully process the ticket, then the state of the ticket is set to "failed" 210. If supervisor 120 determines that the ticket should be retried, then the state is set back to "new" 204. If supervisor 120 determines that the ticket should not be retried (for example, if a limit of retry attempts has been reached), then the state is set to "abort" 214. Supervisor 120 informs the worker 114 that previously processed the ticket of the newly aborted status, and the state is set to "aborted" 216.

Figure 3:
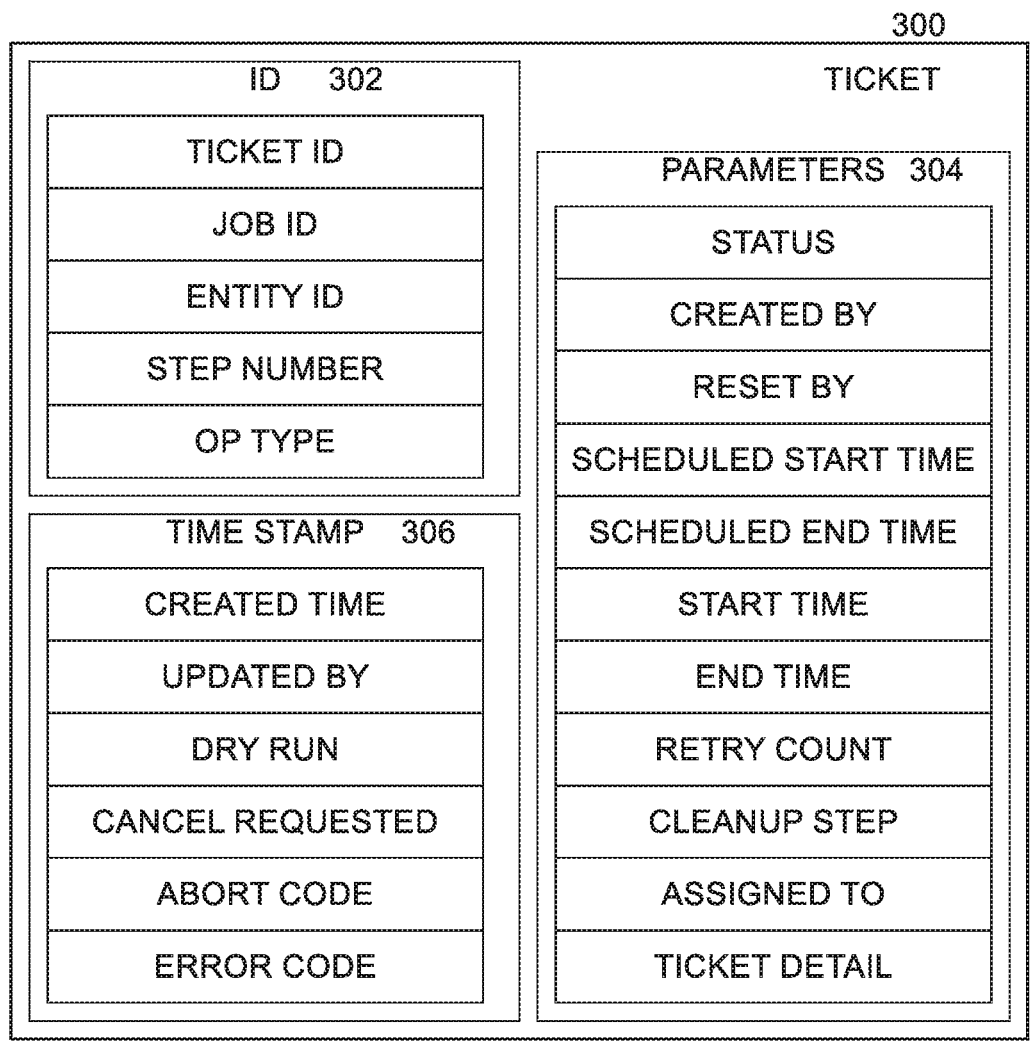
FIG. 3 illustrates an example of a ticket according to some embodiments.

FIG. 3 illustrates an example of a ticket 300 according to some embodiments. In embodiments of the present invention, a ticket comprises a data structure that defines the job to be performed by a worker. Tickets may be created and updated by master 108, stored in ticket database 112, and processed by workers 114. In an embodiment, ticket 300 comprises a plurality of fields of data, such as ID 302, parameters 304, and time stamp 306. In this example, each of these fields comprise a plurality of sub-fields as shown. In other embodiments, other formats, fields, and sub-fields are possible, and are implementation dependent.

An example of a ticket 300 definition according to one embodiment is shown below.

```
public class Ticket {
    @Id
    private String ticketId;
    private String jobId;
    private String entityId;
    private long stepNo;
    private String opType;
    @Enumerated(EnumType.STRING)
    private Ticketstatus status;
    private String createdBy;
    private String resetBy;
    private Timestamp scheduledStartTime;
    private Timestamp scheduledEndTime;
    private Timestamp startTime;
```

-continued

```
private Timestamp endTime;
private int retryCount;
private int cleanupStep;
private String assignedTo;
private String ticketDetail;
@CreationTimestamp
private Timestamp createdTime;
private String updatedBy;
private boolean dryRun;
private boolean cancelRequested;
private String abortCode;
private String errorCode;
}
```

Figure 4:
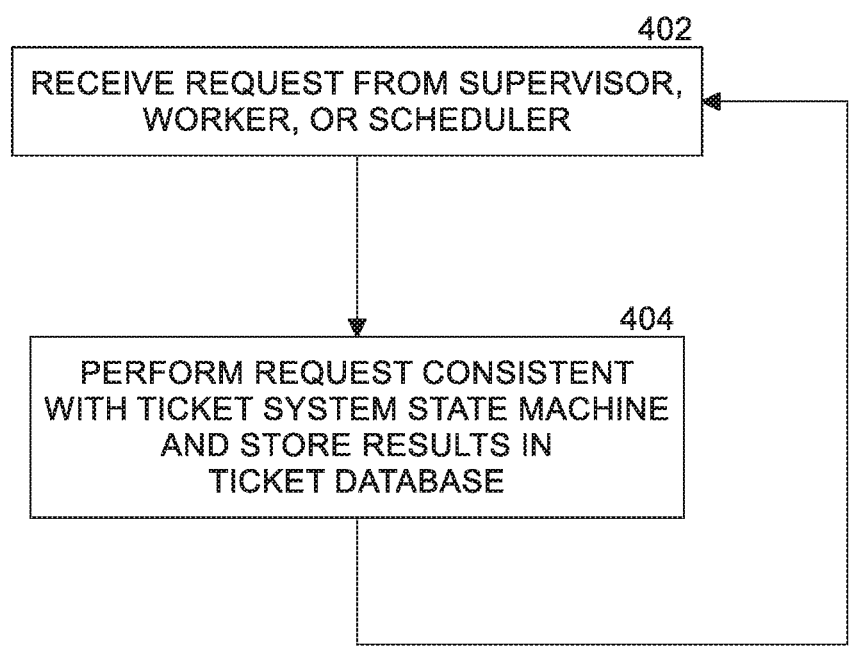
FIG. 4 is a flow diagram of processing by a master according to some embodiments.

FIG. 4 is a flow diagram 400 of processing by master 108 according to some embodiments. In an embodiment, master 108 keeps track of the state of each ticket according to ticket system state diagram 200. In one embodiment, the state of a ticket is stored in the ticket (e.g., in a ticket status field), and the ticket is stored in ticket database 112. At block 402, master 108 receives a request from supervisor 120, one of the workers 114, or scheduler 104. At block 404, master 108 performs the request consistent with ticket system state machine 200 and stores the results of performance of the request in ticket database 112. In an embodiment, types of requests include creating a ticket, updating a ticket, viewing a ticket, and finding tickets that have a time past a deadline (e.g., stale tickets). Other types of requests are possible. If performance of any received request is not allowable according to ticket system state diagram 200, master 108 rejects the request and returns an error status to the caller. Once performance of the request is completed, master 108 processing is complete until the next request is received.

An example of pseudo-code for master 108 is shown below.

```
class MasterAPI(database) {
//HTTP / GRPC server endpoint
fun createTicket(ticket) {
database.insert(ticket)
}
//HTTP / GRPC server endpoint
fun updateTicket(id, status) {
database.updateTicketIfValid(id, status)
}
//HTTP / GRPC server endpoint
fun viewTicket(id or status) -> Ticket {
return database.findById(id) or database.findByStatus(status)
}
//HTTP / GRPC server endpoint
fun getTicket(opType, Optional<entity>, serviceIdentity) -> Ticket {
t = database.findNewTicketByOptype(opType)
t.setStatus(IN_PROGRESS)
t.setAssignedTo(serviceIdentity)
database.save(t)
return t
}
fun findTicketsPastDeadline(deadline) -> List<Ticket> {
return database.findTicketsPastDeadline(deadline)
}
}
```

Figure 5:
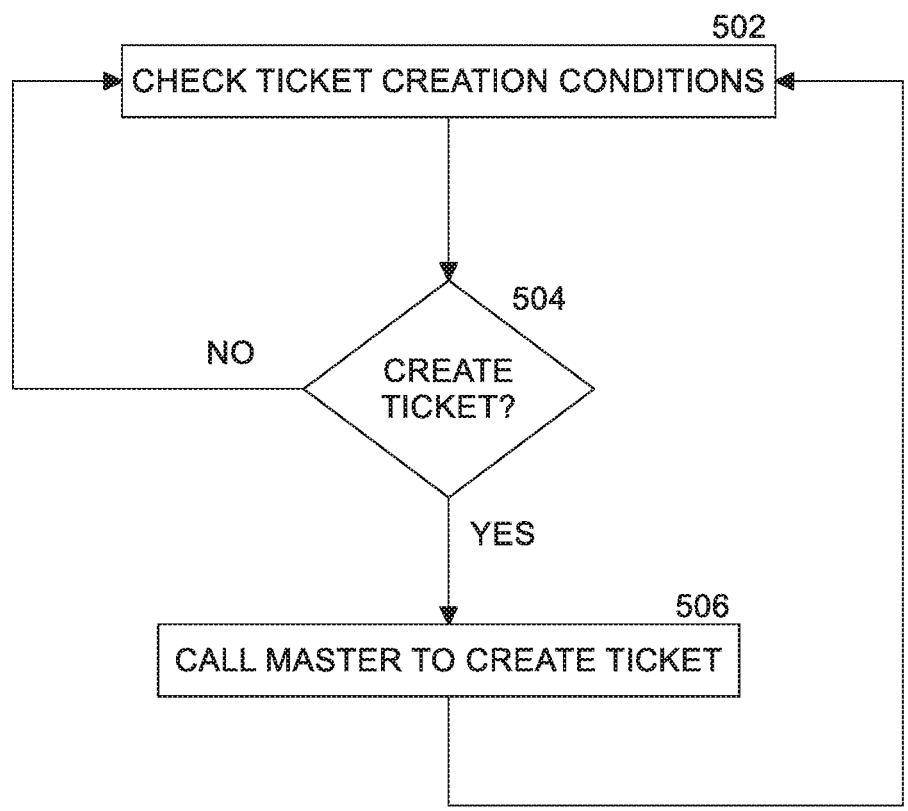
FIG. 5 is a flow diagram of processing by a scheduler according to some embodiments.

FIG. 5 is a flow diagram 500 of processing by scheduler 104 according to some embodiments. At block 502, scheduler 104 checks conditions for ticket creation and determines whether to create a new ticket. In an embodiment, scheduler 104 obtains data from one or more other components of the computing environment, such as applications 102, for example, which provides necessary information to determine whether to create a ticket. Data from applications indicating a set of conditions for determining the need for ticket creation may be any type of information for any type of job/operation (e.g., Op Type) or task, such as flags, user input selections, metrics, values measured against thresholds, time limits, events, program variables, API call results, errors, etc. If scheduler 104 determines that a ticket is to be created at block 404, the scheduler calls master 108 to request that a new ticket is to be created (action 106 on FIG. 1 and "new" state 204 of FIG. 2). Scheduler processing returns to block 402. In an embodiment, scheduler 104 waits a predetermined time before checking conditions again.

An example of pseudo-code for scheduler 104 is shown below.

```
class Scheduler {
fun schedule( ):
while true:
for each opType op:
if ready_to_schedule(op):
createTicket(ticket)
schedule(op)
}
```

Figure 6:
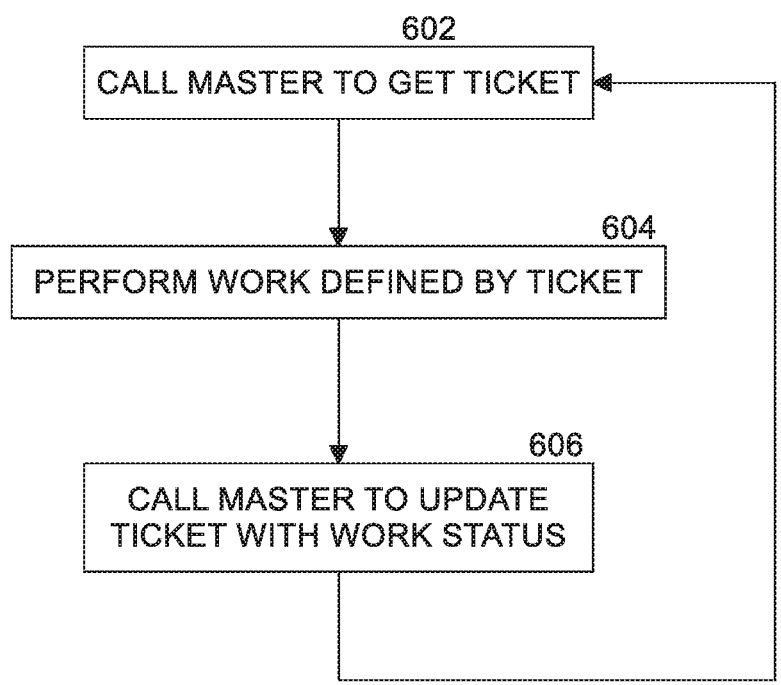
FIG. 6 is a flow diagram of processing by a worker according to some embodiments.

FIG. 6 is a flow diagram 600 of processing by worker 114 according to some embodiments. At block 602, worker 114 calls master 108 to get a ticket (action 116 of FIG. 1 and "in-progress" state 206 of FIG. 2). At block 604, the worker performs the work defined by the ticket (e.g., backing up a database, restoring a database, and so on). When performance of the work is complete, worker 114 calls master 108 to update the ticket (action 118 of FIG. 1 and "completed" state 208 of FIG. 2) with a completed status of the work at block 606. If the worker fails to complete the ticket, worker 114 calls master 108 to update the ticket with a failed status (action 118 of FIG. 1 and "failed" state 210 of FIG. 2) at block 606. Worker 114 then gets the next ticket back at block 602. If a ticket has been created and not yet assigned to a worker, and applications 102 or a system administrator of the computing system reverses the decision to create a ticket, in one embodiment the ticket status by master 108 is changed to "cancelled" state 212 of FIG. 21n another embodiment, the ticket status is changed by the scheduler.

An example of pseudo-code for worker 114 is shown below.

```
class Worker {
fun work( ):
while true:
ticket = master.getTicket(opType, serviceIdentity)
status = work(ticket)
master.updateTicket(task.id, status)
// HTTP / GRPC server endpoint
fun abort(id):
if canAbort(id):
cancelWork(id)
}
```

Figure 7:
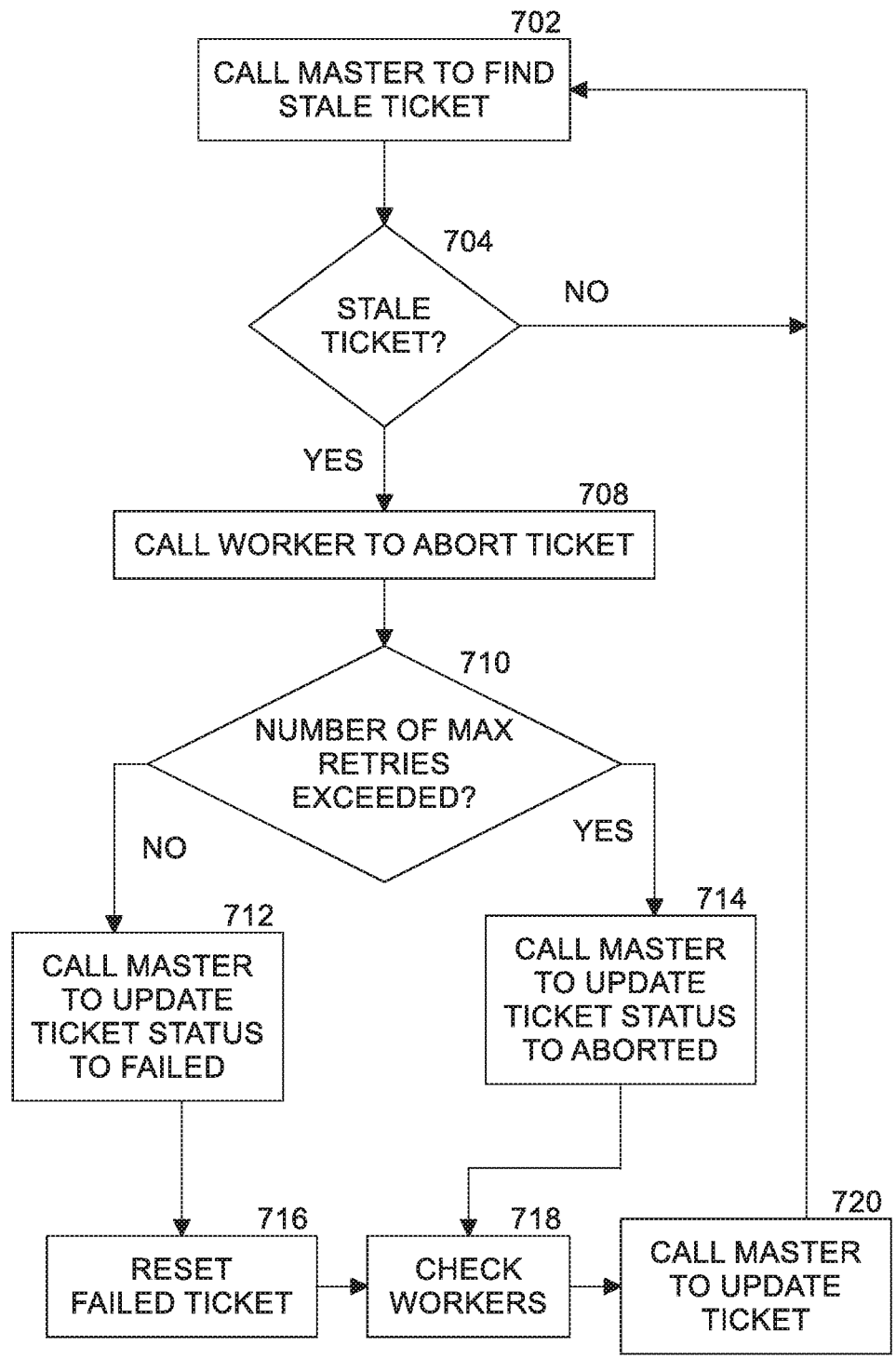
FIG. 7 is a flow diagram of processing by a supervisor according to some embodiments.

FIG. 7 is a flow diagram 700 of processing by supervisor 120 according to some embodiments. At block 702, supervisor 120 calls master 108 to find a stale ticket (or multiple stale tickets). If there is no stale ticket at this point in time at block 704, then supervisor processing returns to check for a stale ticket in future. In an embodiment, this may include performing a wait for a predetermined time prior to the next call for finding a stale ticket. If there is a stale ticket, supervisor 120 calls the worker who is working on the stale ticket at block 708 to abort the job specified by the ticket (action 124 of FIG. 1 and "abort" state 214 of FIG. 2). At block 710, supervisor 120 checks if the maximum number of retries have been exceeded for the stale ticket. If so, supervisor calls master 108 to update the ticket status to aborted (action 128 of FIG. 1, and state 216 of FIG. 2) at block 714 and processing continues with block 718. If the maximum number of retries has not been exceeded for the stale ticket, supervisor 120 calls master 108 to update the ticket status to failed (action 128 of FIG. 1 and "failed" state 210 of FIG. 2). In this case, processing continues with block 716, where supervisor 120 resets the failed ticket. In an embodiment, resetting the failed ticket includes calling master 108 to view the failed ticket (e.g., get the failed ticket from ticket database 112) and updating the status of the failed ticket back to new (actions 126 and 128 of FIG. 1 and "new" state 204 of FIG. 2) in ticket database 112. A retry count in the ticket is also incremented.

At block 718, supervisor 120 checks the status of the tickets being worked on by the workers 114. In an embodiment, the check is performed periodically. In an embodiment, the check may be implemented as a remote procedure call (rpc) from the supervisor to each worker. In an embodiment, the rpc requests the ticket status for each ticket being worked on by a worker. In response, the worker sends a list of ticket IDs and status for each ticket. Supervisor 120 can then update each ticket with master 108 at block 720 based on the received ticket ID list and statuses. If the worker is not aware of a ticket, supervisor 120 sets the ticket state to "failed" (using update ticket function 118 and "failed" state 210 of FIG. 2). Supervisor 120 processing continues with a call to find a stale ticket at block 702. In an embodiment, this may include performing a wait for a predetermined time prior to the next call to master 108 find a stale ticket.

An example of pseudo-code for supervisor 120 is shown below.

```
class Supervisor(master) {
fun findStaleTickets( ):
t: List<Ticket> = master.findTicketsPastDeadline(deadline)
for(ticket in t):
master.updateTicket(ticket.id, FAILED)
fun resetFailedTickets( ):
tickets = master.viewTicket(FAILED)
for(ticket in tickets):
getWorkerFromTicket(ticket).abort( )
master.updateTicket(ticket.id, NEW)
}
```

The software utility cron is a time-based job scheduler in Unix™-like computer operating systems. Users and/or system administrators of computer systems that set up and maintain software environments often use cron to schedule jobs to run periodically at fixed times, dates, or intervals. However, cron merely checks if the current time is the same as the desired time to perform an action (such as execute a job). If the times match, cron causes the action to be performed. In complex cloud computing environments, there may be many dependencies regarding whether to perform an action (such as scheduling creation of a ticket, for example). If the system only checks the time as a requirement, this approach severely limits the capabilities of the system.

Embodiments of the present invention provide a new approach to scheduling based on convergence. At its simplest, convergence is making observations (e.g., obtaining facts) before making decisions and using those observations in the decision-making process. By making an observation and executing an action based on the result of that observation, the system converges on the action that is most appropriate at that time.

A simple example in the real world is deciding when to eat lunch. A person might make several observations prior to deciding when to eat lunch. The person might check the time, ask himself or herself if he or she is hungry, and ask his or her coworkers if they want to get lunch. These observations can be incorporated into an executable policy to decide when to take an action, such as eat lunch.

Given an observation, one or more actions that should be taken in response can be defined as a policy. For example:

If you are hungry→Eat Lunch.

If you are not hungry→[ ].

This is a policy based on a single observation that answers the question "Am I hungry?" (think hunger=true|false).

A policy can be based on one or more observations. Policies and related observations can be codified. For example:

Observer: function ( )-->Observation//where Observation is a record type that contains data Policy: function (Observer)-->[Action]

For example, this can be applied to the lunch scenario:

function foodObserver: {( )→return http.Post("example:8080/isHungry").parse( )} function foodPolicy: {(foodObserver)→if(foodObserver( )) return [EAT] else return [ ]}

This is a simple example, but the concept can be applied in much more complex situations such as heterogeneous large-scale cloud computing environments. In such computing environments, there may be many policies to determine whether to perform an action in the system, such as backing up or restoring a particular database. Given a list of policies (each of which produces a set of zero or more actions), one embodiment of the present invention determines the intersection of the policies to decide what actions are safe to run. In one embodiment, the system only executes actions that are agreed upon by all policies. For example, if one policy produces the empty set [ ] and all other policies produce the action [EAT], lunch will not be eaten.

This can be represented in set notation:

$$\{f_n(x_n) \cap f_{n-1}(x_{n-1}) \cap \ldots \cap f_1(x_1) | f(x) = [\text{actions}]\} = \text{Action}$$

Where $x_n$ is an observation, and $f_n$ is a policy function.

Execution and intersection of policies can be performed at any interval (as system performance constraints allow). This approach is fault-tolerant since if the scheduler goes down and comes back up, no state information is lost, since the state is recomputed on each iteration. This approach is better than the cron approach because observations reflect the source of truth whenever possible to determine the action rather than relying solely on time. If a host system goes down right before a cron job kicks off and comes up an hour later, the host system may have missed executing some jobs. This won't occur in embodiments of the present invention.

In embodiments, a scheduling process applied by scheduler 104 of ticketing system 100 is based on observable facts, where each fact has an associated policy. The facts (e.g., observed events) can be grouped into sets, and operations on these sets result in the scheduling of work (such as can be represented by a ticket).

Other example observation and policy pairs are:
if observation(db cpu % used)>80% return { }
else return {FULL_BACKUP, INCR_BACKUP}
if observation(is_off_peak_hours) return {FULL_BACKUP, INCR_BACKUP}
else return {INCR_BACKUP}//only take full backups during off hours For some computing systems, such as those that handle sending emails to customers during outages, an example observation such as "Time since last update email was sent" and an example policy could be:
if(time since last update)>6 hours return {SEND_EMAIL}
else { }
This makes sure that customers don't receive more than one email every 6 hours.

If a reducer is used such as maximum instead of intersection, a discount may be calculated (e.g., represented by % off total price):
if observation(coupon code==FAKE_CODE) return {15%}
else return {0%}
if(observation(coupon code==OTHER_FAKE_CODE) return {20%} else return {0%}
if(observation(IS_BLACK_FRIDAY) return {60%} else return {0%}

A computer system must be careful implementing policies such as these else stacked discounts could be valid (a potentially undesired behavior) and using a reducer like max with disparate policies makes that the default.

Convergence scheduling as described herein is a novel method of using set theory to automate decision making by applying a reducer (examples herein use set intersection as a reducer, although other operations may also be used) to a set of policies. An observer is a function that optionally takes one or more input values and produces an output value (e.g., an observation). The input value type and the output value type are the same for all policies so scheduler 104 operates on defined observations. A policy is a function that accepts one or more observations (from an observer) and produces a set of zero or more actions (e.g., the set of actions can be empty/null). Optionally an input value can be passed into a policy to be forwarded to an observer. In some embodiments, the functionality of a policy and an associated observer may be combined into a single component.

An action is a generic type that is implemented using an enumeration but can be any complex data type. The only requirement is that the set is uniform in type and that the policies produce a finite number of actions. In an embodiment, a set of any kind can be returned by a policy, but for scheduling it is convenient to use a set of actions. An action can be represented as numbers, words, complex data, etc. In some embodiments, adherence to the following produces reliable convergence scheduling. All policies and observations are read only and produce no side-effects to other system components (a side effect is defined as a visible effect that can be observed by an outsider to the system, including database writes, system modifications, etc.). The convergence scheduler is run as frequently as possible to keep up with real-time observations of the system.

Given a list of observer and policy pairs, each policy can be invoked (which in turn invokes its respective observer) and a list of sets of actions is returned. One goal is to reduce the list of sets of actions to a single set of actions. In an embodiment, a reducer is used, which is a function that takes a list of sets and produces a single set (formally a reducer takes a collection of T, where T is a generic and produces a single instance of T). A common reducer is the intersection operation (e.g., union). By invoking the reducer on the list of sets of actions, a set of actions that are safe to be scheduled is obtained according to the policies. For the case of intersection, that is finding all items that can be found in all sets. If any set is the empty set, the result is the empty set.

For each Pair<Observer, Policy>, the Policy is invoked with the associated Observer, and then the reducer is invoked on the result to transform the List<Pair<Policy, Observer>> into List<Set<Action>>. The reducer then produces a Set<Action>. An example of how this can be coded is shown below.

```
//Written functionally
val reducer = Set::Intersection
val actions: Set<Action> = policies
  .map { (policy, observer) -> policy(observer, observable)}
  .reducer(default = emptySet( )) { res, curr -> res.reducer(curr) }
//Written Imperatively
val actionSets: List<Set<Action>> = emptySet( )
for((policy, observer) in policies) {
    actionSets.add(policy(observer))
}
return reducer(actionSets)
```

Figure 8:
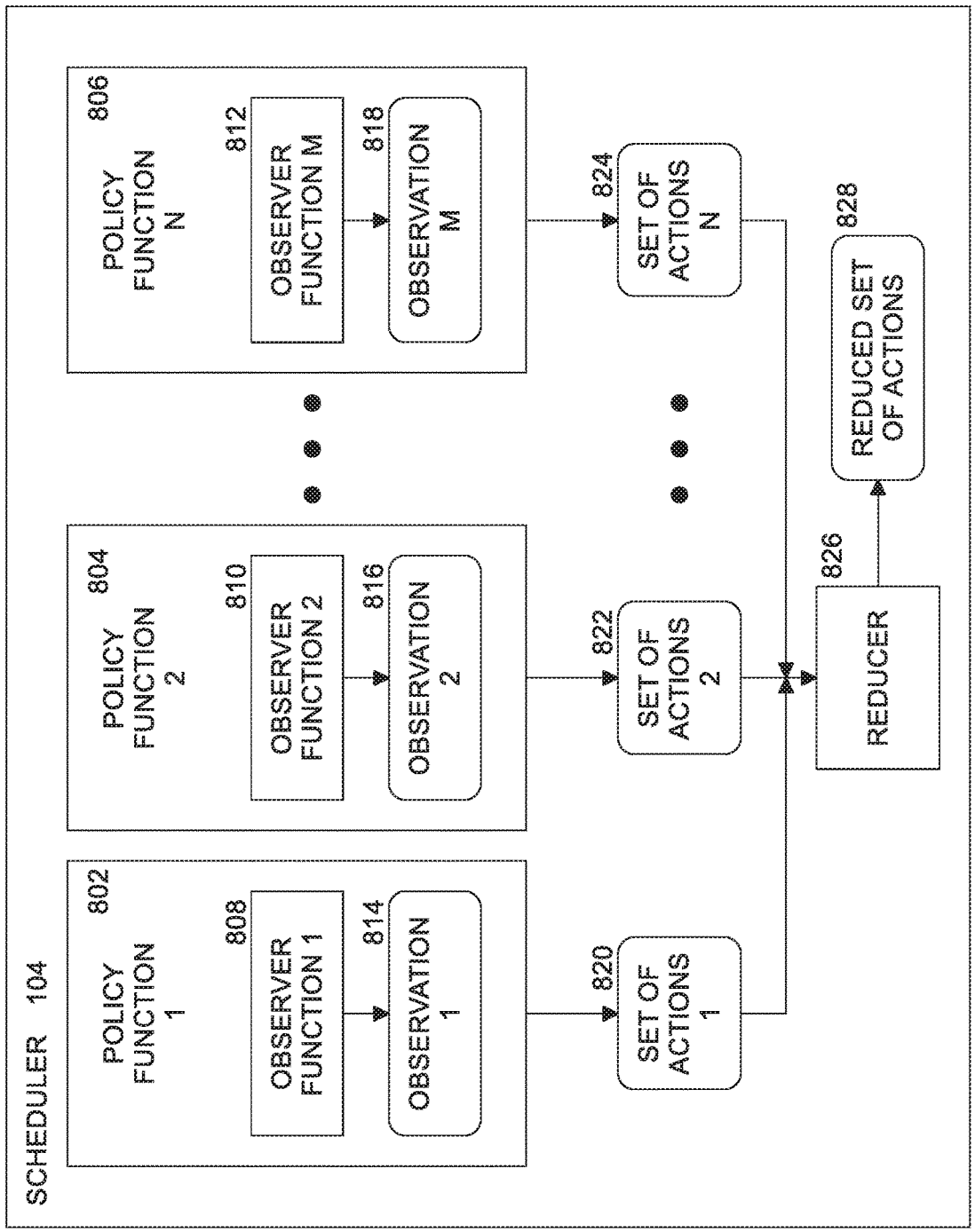
FIG. 8 is a diagram of a scheduler according to some embodiments.

FIG. 8 is a diagram of a scheduler 104 according to some embodiments. In one embodiment, scheduler 104 of FIG. 8 performs block 502 of FIG. 5 described above, to check the ticket creation conditions. In one embodiment, scheduler 104 is a convergence scheduler. Scheduler 104 includes a plurality of policy functions, such as policy function 1 802, policy function 2 804, . . . policy function N 806, where N is a natural number. Scheduler 104 invokes the plurality of policy functions. In an embodiment, invocation of policy functions is performed on a periodic basis (e.g., every minute, every two minutes, every five minutes, etc.). In an embodiment, policy functions may be executed in parallel on a computing system (e.g., in different processes, different tasks, different processing cores, etc.).

Each policy function includes at least one observer function. For example, policy function 1 802 includes observer function 1 808, policy function 2 804 includes observer function 2 810, . . . policy function N 806 includes observer function M 812, where M is a natural number. In some embodiments, a policy function may include more than one observer function, so M>=N. Each observer function, when invoked, makes at least one observation (e.g., detection of an event, a status, a fact, etc.) about the cloud computing environment. For example, observer function 1 808 makes observation 1 814, observer function 2 810 makes observation 2 816, . . . observer function M 812 makes observation M 818. In an embodiment, an observation may be a null value. In some embodiments, an observer function may make more than one observation per invocation. A policy function determines a set of actions based at least in part on the associated observer function's one or more observations. For example, policy function 1 802 determines set of actions 1 820 based at least in part on observation 1 814, policy function 2 804 determines set of actions 2 822 based at least in part on observation 2 816, . . . policy function N 806 determines set of actions N 824 based at least in part on observation M 818.

Scheduler 104 inputs the sets of actions 820, 822, . . . 824 to reducer 826. Reducer 826 reduces the sets of actions to a reduced set of actions 828. In an embodiment, reducer 826 applies an intersection set operation to sets of actions 820, 822, . . . 824, to produce reduced set of actions 828. In other embodiments, other set operations may be performed such as maximum. Scheduler then performs reduced set of actions 828 to effect change in ticketing system 100. In one embodiment, performing reduced set of actions 828 results in one or more tickets being created. In other embodiments, other actions in the cloud computing environment may be performed.

Figure 9:
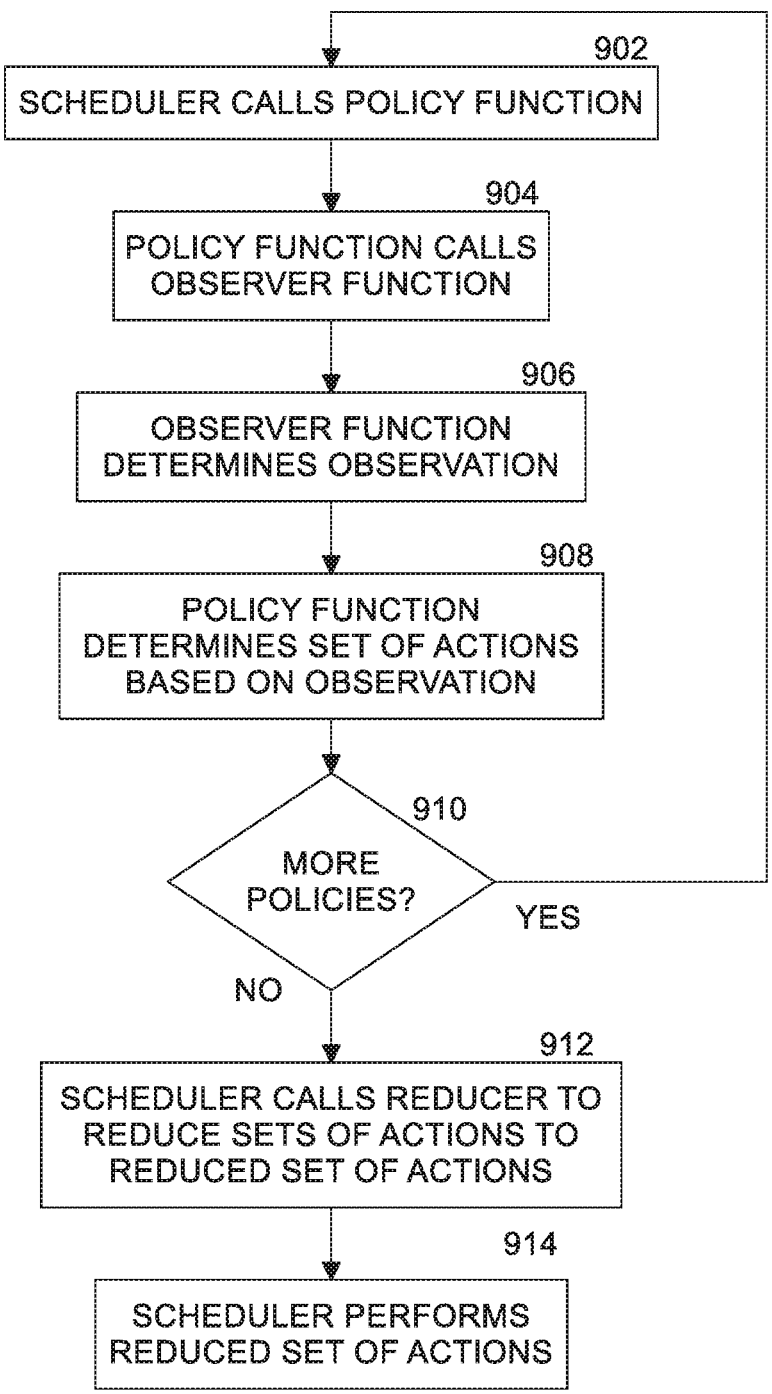
FIG. 9 is a flow diagram of processing by a scheduler according to some embodiments.

FIG. 9 is a flow diagram 900 of processing by a scheduler 104 according to some embodiments. At block 902, scheduler 104 calls/invokes a policy function (e.g., policy function 1 802). At block 904, the policy function calls/invokes an associated observer function (e.g., observer function 1 808). At block 906, the observer function determines an observation (e.g., observation 1 814). Blocks 904 and 906 may be repeated if the policy function includes multiple observer functions. At block 908, the policy function determines a set of actions (e.g., set of actions 1 820) based at least in part on the one or more observations. At block 910, if there are more policies, then scheduler processing continues back at block 902 with the next policy function (e.g., policy function 2 804). If there are no more policies to process (e.g., policy function N 806 was processed), then scheduler processing continues with block 912. At block 912, scheduler 104 calls reducer 826 to reduce the sets of actions (e.g., 820, 822, . . . 824) to generate a reduced set of actions 828. At block 914, scheduler 104 performs, or causes to be performed, the reduced set of actions.

In one embodiment, ticket system 100 uses the scheduler process of FIG. 8 to schedule jobs in ticketing system 100 in a flexible, fault-tolerant manner. The ticketing system defines at least two policies that rely on ticket database 112. A first policy "observes" the last ticket for a particular op-type and if the last ticket has a status of IN PROGRESS or NEW, the policy function returns the empty set (so nothing new will be scheduled for the ticket), otherwise the policy function returns a set containing that op-type (so something will be scheduled). This is a "serial scheduling policy" as the policy ensures tickets are scheduled serially. A second policy observes the last completed ticket for a particular op-type and if the time since the ticket started is greater than the configured frequency the policy function returns a set containing that op-type, otherwise the empty set is returned. This is a "frequency scheduling policy" as the policy ensures scheduling of tickets at a certain cadence (similar to cron). Other policies for the ticketing system may be defined, according to unique constraints/requirements depending on the job or work to be performed. For the op-type of RMAN_L1 for example, it can be disruptive to make this backup during business hours so a policy can be implemented such that the policy function returns the empty set if the current time is during business hours (e.g., 8 am to 5 pm) and returns a set containing RMAN_L1 if the current time is off-peak hours (e.g., 5 pm to 8 am).

Figure 10:
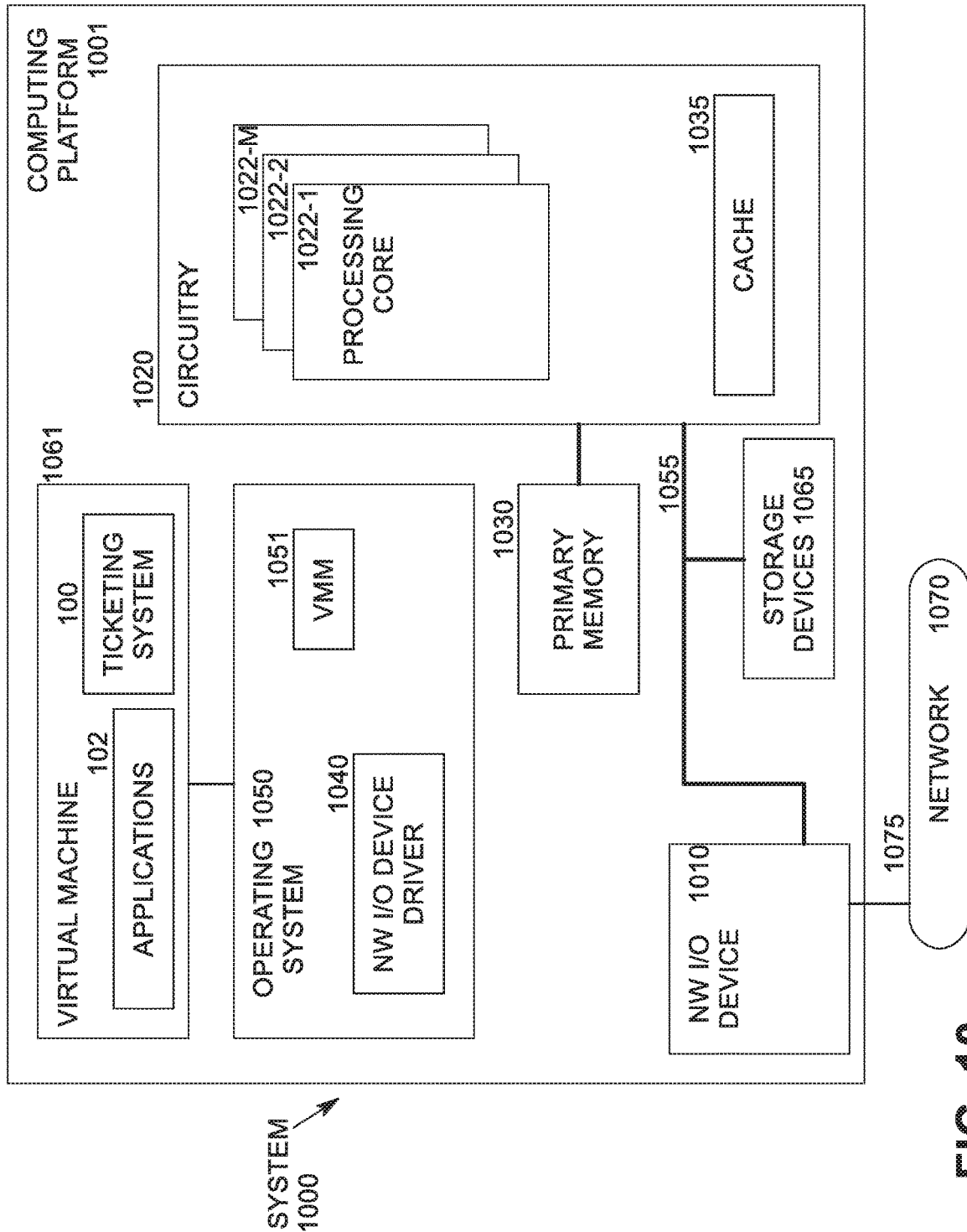
FIG. 10 illustrates an example computing system according to some embodiments.

FIG. 10 illustrates an example computing system 1000 for implementing ticket system 100. As shown in FIG. 10, computing system 1000 includes a computing platform 1001 coupled to a network 1070 (which may be the Internet, for example). In some examples, as shown in FIG. 10, computing platform 1001 is coupled to network 1070 via network communication channel 1075 and through at least one network (NW) input/output (I/O) device 1010. In an embodiment, network I/O device 1010 comprises a switch, a network interface controller (NIC) having one or more destination ports (not shown) connected or coupled to network communication channel 1075. In an embodiment, network communication channel 1075 includes a PHY device (not shown). In an embodiment, network I/O device 1010 includes an Ethernet NIC. Network I/O device 1010 transmits data packets from computing platform 1001 over network 1070 to other destinations and receives data packets from other destinations for forwarding to computing platform 1001.

According to some examples, computing platform 1001, as shown in FIG. 10, includes circuitry 1020, primary memory 1030, operating system (OS) 1050, NW I/O device driver 1040, virtual machine manager (VMM) (also known as a hypervisor) 1051, at least one application 102 running in a virtual machine (VM) 1061, ticketing system 100, and one or more storage devices 1065. In one embodiment, OS 1050 is Linux™. In another embodiment, OS 1050 is Windows® Server. Other OSs may also be used. Network I/O device driver 1040 operates to initialize and manage I/O requests performed by network I/O device 1010. In an embodiment, packets and/or packet metadata transmitted to network I/O device 1010 and/or received from network I/O device 1010 are stored in one or more of primary memory 1030 and/or storage devices 1065. In one embodiment, at least one application 102 is a database management system.

In an embodiment, ticketing system 100 is part of OS 1050. In another embodiment, ticketing system 100 is implemented in circuitry 1020.

In at least one embodiment, storage devices 1065 may be one or more of hard disk drives (HDDs) and/or solid-state drives (SSDs). In an embodiment, storage devices 1065 may be non-volatile memories (NVMs). In some examples, as shown in FIG. 10, circuitry 1020 may communicatively couple to network I/O device 1010 via communications link 1055. In one embodiment, communications link 1055 is a peripheral component interface express (PCIe) bus conforming to version 3.0 or other versions of the PCIe standard published by the PCI Special Interest Group (PCI-SIG).

In some examples, operating system 1050, NW I/O device driver 1040, ticketing system 100, VM 1061, and application 102 are implemented, at least in part, via cooperation between one or more memory devices included in primary memory 1030 (e.g., volatile or non-volatile memory devices), storage devices 1065, and elements of circuitry 1020 such as processing cores 1022-1 to 1022-*m*, where "m" is any positive whole integer greater than 2. In an embodiment, OS 1050, VMM 1051, NW I/O device driver 1040, ticketing system 100, VM 1061 and application 102 are executed by one or more processing cores 1022-1 to 1022-*m*.

In some examples, computing platform 1001, includes but is not limited to a server, a server array or server farm, a web server, a network server, an Internet server, a work station, a mini-computer, a main frame computer, a supercomputer, a network appliance, a web appliance, a distributed computing system, multiprocessor systems, processor-based systems, a laptop computer, a tablet computer, a smartphone, a system-on-a-chip (SoC), or a combination thereof. In one example, computing platform 1001 is a disaggregated server. A disaggregated server is a server that breaks up components and resources into subsystems (e.g., network sleds). Disaggregated servers can be adapted to changing storage or compute loads as needed without replacing or disrupting an entire server for an extended period of time. A server could, for example, be broken into modular compute, I/O, power and storage modules that can be shared among other nearby servers.

Circuitry 1020 having processing cores 1022-1 to 1022-*m* may include various commercially available processors, including without limitation Intel® Atom®, Celeron®, Core (2) Duo®, Core i3, Core i5, Core i7, Itanium®, Pentium®, Xeon® or Xeon Phi® processors, ARM processors, and similar processors. Circuitry 1020 may include at least one cache 1035 to store data.

According to some examples, primary memory 1030 may be composed of one or more memory devices or dies which may include various types of volatile and/or non-volatile memory. Volatile types of memory may include, but are not limited to, dynamic random-access memory (DRAM), static random-access memory (SRAM), thyristor RAM (TRAM) or zero-capacitor RAM (ZRAM). Non-volatile types of memory may include byte or block addressable types of non-volatile memory having a 3-dimensional (3-D) cross-point memory structure that includes chalcogenide phase change material (e.g., chalcogenide glass) hereinafter referred to as "3-D cross-point memory". Non-volatile types of memory may also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), magneto-resistive random-access memory (MRAM) that incorporates memristor technology, spin transfer torque MRAM (STT-MRAM), or a combination of any of the above. In another embodiment, primary memory 1030 may include one or more hard disk drives within and/or accessible by computing platform 1001.

Figure 11:
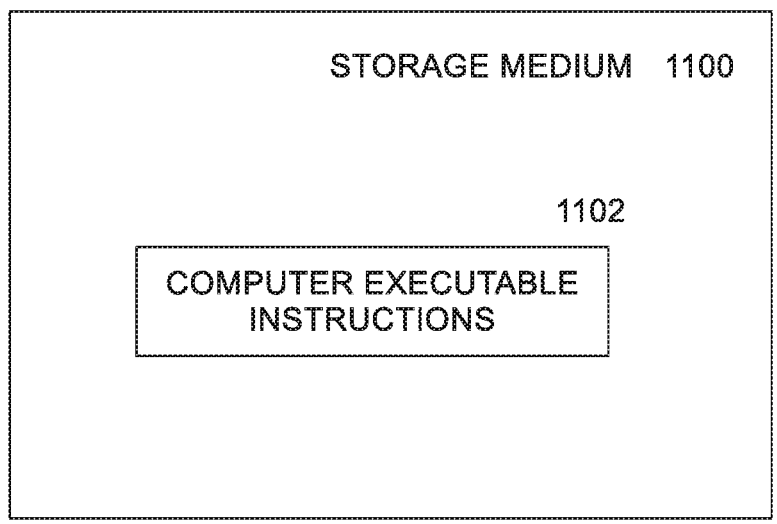
FIG. 11 illustrates an example of a storage medium.

FIG. 11 illustrates an example of a storage medium 1100. Storage medium 1100 may comprise an article of manufacture. In some examples, storage medium 1100 includes any non-transitory tangible computer readable medium or machine readable medium, such as an optical, magnetic or semiconductor storage. Storage medium 1100 may store various types of computer executable instructions, such as instructions 1102 to implement logic flows and systems described above in FIGS. 1 through 9. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 12:
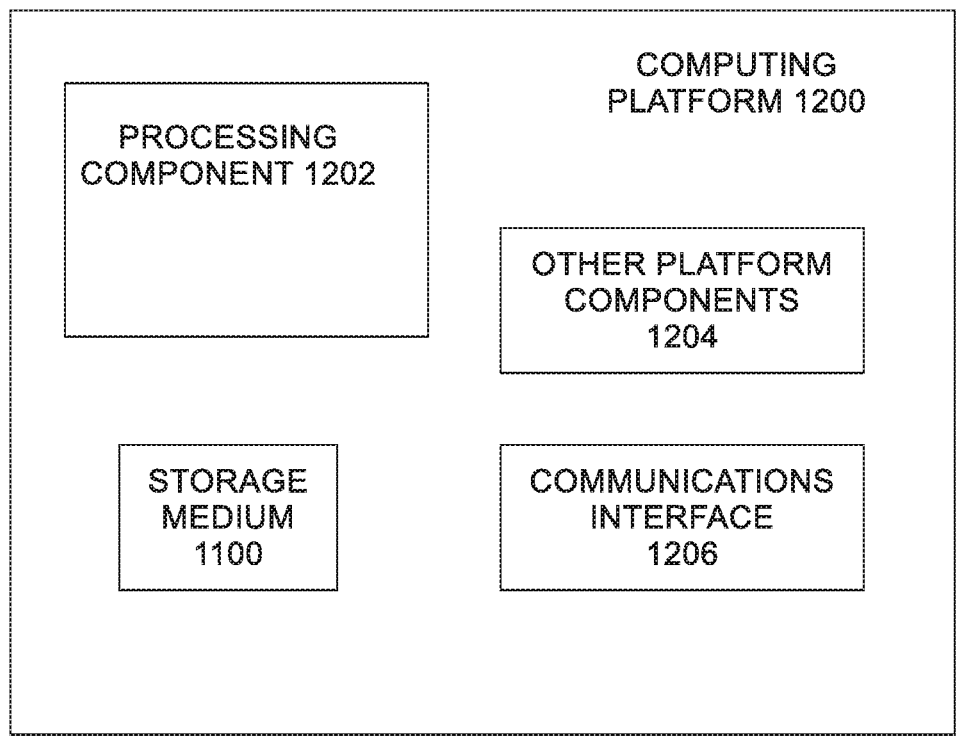
FIG. 12 illustrates another example computing platform.

FIG. 12 illustrates an example computing platform 1200. In some examples, as shown in FIG. 12, computing platform 1200 may include a processing component 1202, other platform components 1204 and/or a communications interface 1206.

According to some examples, processing component 1202 may execute processing operations or logic for instructions stored on storage medium 1100 (and described above with reference to FIGS. 1 through 9). Processing component 1202 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1204 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), types of non-volatile memory such as 3-D cross-point memory that may be byte or block addressable. Non-volatile types of memory may also include other types of byte or block addressable non-volatile memory such as, but not limited to, multi-threshold level NAND flash memory, NOR flash memory, single or multi-level PCM, resistive memory, nanowire memory, FeTRAM, MRAM that incorporates memristor technology, STT-MRAM, or a combination of any of the above. Other types of computer readable and machine-readable storage media may also include magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 1206 may include logic and/or features to support a communication interface. For these examples, communications interface 1206 may include one or more communication interfaces that operate according to various communication protocols or standards to communicate over direct or network communication links or channels. Direct communications may occur via use of communication protocols or standards described in one or more industry standards (including progenies and variants) such as those associated with the peripheral component interconnect express (PCIe) specification. Network communications may occur via use of communication protocols or standards such those described in one or more Ethernet standards promulgated by the Institute of Electrical and Electronics Engineers (IEEE). For example, one such Ethernet standard may include IEEE 802.3. Network communication may also occur according to one or more OpenFlow specifications such as the OpenFlow Switch Specification.

The components and features of computing platform 1200, including logic represented by the instructions stored on storage medium 1100 may be implemented using any combination of discrete circuitry, ASICs, logic gates and/or single chip architectures. Further, the features of computing platform 1200 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 1200 shown in the block diagram of FIG. 12 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASIC, programmable logic devices (PLD), digital signal processors (DSP), FPGA, memory units, logic gates, registers, semiconductor device, chips, microchips, chip sets, and so forth. In some examples, software elements may include software components, programs, applications, computer programs, application programs, system programs, machine programs, operating systems software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples include an article of manufacture or at least one computer-readable medium. A computer-readable medium includes a non-transitory storage medium to store logic. In some examples, the non-transitory storage medium includes one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Included herein are logic flows or schemes representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow or scheme may be implemented in software, firmware, and/or hardware. In software and firmware embodiments, a logic flow or scheme may be implemented by computer executable instructions stored on at least one non-transitory computer readable medium or machine readable medium, such as an optical, magnetic or semiconductor storage. The embodiments are not limited in this context.

Some examples are described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," " "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
a processing device; and
a memory device coupled to the processing device, the memory device having instructions stored thereon that, in response to execution by the processing device, cause the processing device to:
determine a plurality of sets of one or more actions based at least in part on a plurality of policies and the one or more observations;
reduce the plurality of sets of one or more actions to generate a reduced set of actions, the reduced set of actions including scheduling a computing system to execute the reduced set of actions by requesting one or more idempotent tickets to be created in a ticketing system; and perform, or cause to be performed, the reduced set of actions.

2. The apparatus of claim 1, wherein instructions to reduce the plurality of sets comprise instructions to perform an intersection set operation on the plurality of sets of one or more actions to generate the reduced set of actions.

3. The apparatus of claim 1, wherein instructions to determine the one or more observations comprises instructions to determine the one or more observations by one or more observer functions.

4. The apparatus of claim 3, wherein instructions to determine the plurality of sets of one or more actions comprises instructions to determine the plurality of sets of one or more actions by one or more policy functions, respectively, the one or more policy functions calling the one or more observer functions.

5. The apparatus of claim 1, wherein the actions comprise operations on a database system.

6. The apparatus of claim 1, comprising instructions to receive the plurality of policies from one or more applications being executed by the computing system.

7. The apparatus of claim 1, wherein instructions to perform, or cause to be performed, the reduced set of actions comprise instructions to perform, or cause to be performed, only actions that are agreed upon by all the plurality of policies.

8. The apparatus of claim 1, wherein the plurality of policies comprises functions that accept one or more observations from one or more observers and produces sets of zero or more actions.

9. The apparatus of claim 1, wherein the plurality of policies and the one or more observations produce no side-effects to other components of the computing system.

10. A computer-implemented method, comprising:
determining one or more observations about a computing system;
determining a plurality of sets of one or more actions based at least in part on a plurality of policies and the one or more observations;
reducing the plurality of sets of one or more actions to generate a reduced set of actions, the reduced set of actions including scheduling a computing system to execute the reduced set of actions by requesting one or more idempotent tickets to be created in a ticketing system; and
performing, or causing to be performed, the reduced set of actions.

11. The computer-implemented method of claim 10, wherein the reducing comprises performing an intersection set operation on the plurality of sets of one or more actions to generate the reduced set of actions.

12. The computer-implemented method of claim 10, wherein determining the one or more observations is performed by one or more observer functions.

13. The computer-implemented method of claim 12, wherein determining the plurality of sets of one or more actions is performed by one or more policy functions, respectively, the one or more policy functions calling the one or more observer functions.

14. The computer-implemented method of claim 10, wherein the actions comprise operations on a database system.

15. The computer-implemented method of claim 10, comprising receiving the plurality of policies from one or more applications being executed by the computing system.

16. The computer-implemented method of claim 10, wherein performing, or causing to be performed, the reduced set of actions comprises performing, or causing to be performed, only actions that are agreed upon by all the plurality of policies.

17. The computer-implemented method of claim 10, wherein the plurality of policies comprises functions that accept one or more observations from one or more observers and produces sets of zero or more actions.

18. The computer-implemented method of claim 10, wherein the plurality of policies and the one or more observations produce no side-effects to other components of the computing system.

19. At least one tangible machine-readable medium comprising a plurality of instructions that in response to being executed by a processor in a computing system cause the processor to:
determine a plurality of sets of one or more actions based at least in part on a plurality of policies and the one or more observations;
reduce the plurality of sets of one or more actions to generate a reduced set of actions, the reduced set of actions including scheduling a computing system to execute the reduced set of actions by requesting one or more idempotent tickets to be created in a ticketing system; and
perform, or cause to be performed, the reduced set of actions.

20. The at least one tangible machine-readable medium of claim 19, wherein instructions to reduce the plurality of sets comprise instructions to perform an intersection set operation on the plurality of sets of one or more actions to generate the reduced set of actions.

21. The at least one tangible machine-readable medium of claim 19, wherein instructions to determine the one or more observations comprises instructions to determine the one or more observations by one or more observer functions.

22. The at least one tangible machine-readable medium of claim 19, wherein instructions to determine the plurality of sets of one or more actions comprises instructions to determine the plurality of sets of one or more actions by one or more policy functions, respectively, the one or more policy functions calling the one or more observer functions.

23. The at least one tangible machine-readable medium of claim 19, wherein the actions comprise operations on a database system.

* * * * *